3,362,876
3-METHYL-3,4-DIHYDROXY-4-PHENYL-BUTINE-1 AS A POTENTIATOR FOR SALICYLATES

Salvatore Joseph De Salva, Somerset, N.J., assignor to Colgate-Palmolive Company, New York, N.Y., a corporation of Delaware
No Drawing. Filed Mar. 1, 1966, Ser. No. 530,803
1 Claim. (Cl. 167—65)

This invention relates to the potentiation of analgesic drugs.

It is well known that the prolonged use of analgesics such as aspirin and the like produce toxic side effects. This is also true of the use of large dosages of analgesics which in some patients may produce serious side effects. Consequently, the art is replete with a variety of additives to be used in conjunction with aspirin or like analgesics in order to mitigate said toxic side effects and still maintain a pharmaceutically active composition.

Accordingly, it is a primary object of this invention to provide a non-toxic potentiator for analgesic substances to permit the reduction of the dosage and the treatment period with said analgesic.

It has now been discovered that the pain-relieving properties of analgesics such as aspirin are potentiated by the addition of a compound represented by the following structural formula:

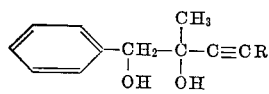

wherein R is selected from the class consisting of hydrogen, lower and higher aliphatic radicals, cyclic and heterocylic radicals. The nature of the R radical would determine the speed and duration of the pharmacological activity of the compound. A lower aliphatic group allows for a quick onset of activity, whereas the longer aliphatic chains would be effective for treatment over a prolonged period of time. Consequently, the choice of compound would depend on the particular circumstance of its use. It is clearly apparent from the chemical structure that these compounds have no relation either to the alkaloids or to the barbiturates and cannot be compared thereto.

The chemical nomenclature of the compound wherein the R radical is a hydrogen ion is 3-methyl-3,4-dihydroxy-4-phenyl butine-1, which is known to have mild sedative and hypnotic activity, with substantially no toxic side effects. Chronic toxicity tests on mice revealed no visible signs of impairment. Histological examination of organs likewise revealed no damage. Compatibility of the aforesaid butine compound in therapeutic dosage has been found to be exceptionally good. Hepatic functional tests following administration have shown no physiological impairment. These is no evidence of habituation to this drug even with usage over long periods of time. It is understood that suitable non-toxic homologues of this butine compound are also contemplated by this invention.

The unusual increase in the analgesic effects of aspirin when used in conjunction with the butine compound is clearly evident from Table I, wherein mice were intraperitoneally injected with phenyl-p-quinone in sufficient dose to cause writhing for at least 50 minutes. Ten minutes after writhing occurred, various combinations of aspirin and butine compound were administered orally (by stomach tube). After a lapse of twenty minutes the number of mice still showing the writhing reflex were considered to be unprotected.

TABLE I

| Amount of aspirin (acetyl salicylic acid), mg./kg. | Amount of 3-methyl-3,4-dihydroxy-4-phenyl butine - 1 | Number of mice sedated—protection, percent |
|---|---|---|
| 500 | 0 | 60 |
| 250 | 0 | 30 |
| 0 | 250 | 30 |
| 0 | 125 | 10 |
| 0 | 63 | 0 |
| 250 | 250 | 80 |
| 250 | 125 | 50 |
| 250 | 63 | 50 |

This table clearly shows the synergistic analgesic effect of combining aspirin with 3-methyl-3,4-dihydroxy-4-phenyl-butine-1. Whereas, a 250 mg. dose of either compound alone affords only 30% protection, a combined dose of 250 mg. of each compound results in 80% protection which is greater than the additive effects of both (30+30%). In addition, the 80% protection afforded by the use of the combination of equal quantities of each compound totaling 500 mg. is greater than the 60% protection exhibited when utilizing 500 mg. of aspirin alone. The synergism exhibited by this combination of compounds is also evident when using smaller amounts of the butine compound. Consequently, more effective pharmacological action with a reduction in toxic side effects is obtained since less of the analgesic is required to treat the patient. Furthermore, this formulation will allow more frequent usage without fear of unnecessary accumulative reaction to the analgesic, since smaller dosages are used.

The relative proportions of analgesic and potentiating agent present in the instant preparations are not critical. This will depend on the type and severity of the symptoms to be treated.

However, a ratio of about 1:1 to 4:1 of the analgesic: potentiating agent by weight is the desired range. Generally speaking, single doses of a maximum of 100 mg. analgesic plus a maximum of 100 mg. potentiator will be used as the rapeutically effective central depressant. The daily dose should normally not exceed four single doses equally spaced time-wise. The amount of potentiating compound will vary widely, depending on the particular drugs to be potentiated, the potentiating effect desired and the nature of the disease or condition being treated. Similarly, the amount of the selected analgesic drug to be potentiated will also vary depending on the physiological effect to be achieved and the nature of the condition to be treated.

Although aspirin has been specifically tested and evaluated because it is most often used to relieve headaches, toothaches, neuralgia, rheumatic and muscular pains, other narcotic and non-narcotic analgesic agents are contemplated by the present invention. Suitable narcotic analgesics include morphine, phenazocine, α-propoxyphene, methodine, pethidine (1-alkyl-4-phenyl-piperidine-4-alkyl carbonate) and derivatives thereof. Suitable non-narcotic analgesic agents include salicylates such as acetylsalicylic acid (aspirin), sodium salicylate, ammonium salicylate, etc., phthalic acid, benzomethazine, aniline, pyrazole, muscle relaxants such as tris[diethylamino-ethyl-hydroxy] - 1,2,3 - benzene-triiodoethylate, etc., tranquilizers such as 3 - o - methoxyphenoxy-2-hydroxypropyl-carbamate, etc., and sympathomimetic amines such as 1-phenyl-2-aminopropane, phenyl isopropylmethylamine, phenyl-isopropylamine sulfate (amphetamine sulfate), etc.

The essential ingredients of this composition may be compounded in a variety of forms inclusive of pills, tablets, capsules, troches, lozenges, powder, and solutions or suspensions for either oral administration or by injection.

Various non-toxicant additives may also be included without adversely affecting the analgesic function of the composition, such as natural and synthetic gums such as gum acacia, gum tragacanth, gum karaya, potassium alginate, sodium carboxymethyl cellulose, methyl cellulose, and the like, talc, starch, other extenders and/or fillers, citric or tartaric acid, coloring agents, flavoring and/or sweetening substances, preservatives, etc.

Although the present invention has been described with reference to particular embodiments and examples, it will be apparent to those skilled in the art that variations and modifications of this invention can be made and that equivalents can be substituted therefor without departing from the principles and true spirit of the invention.

What is claimed by Letters Patent is:

1. A therapeutic composition comprising an analgesic substance and a potentiating agent, said analgesic substance comprising acetyl salicylic acid and said potentiating agent comprising 3-methyl-3,4-dihydroxy-4-phenyl-butine-1, the proportion of said analgesic to said potentiating agent being within the ratio of 1:1 to 4:1 by weight respectively.

References Cited

Merck Index, 7th Ed. (1960), pp. 693, 862, and 960, to 961.

Chem. Abstracts, 60 page 6091e (1964).

ALBERT T. MYERS, *Primary Examiner.*

JULIAN S. LEVITT, *Examiner.*

S. J. FRIEDMAN, *Assistant Examiner.*